Feb. 26, 1963 S. A. McGAVERN 3,078,737
TUNED FRICTION DAMPER
Filed Nov. 12, 1959
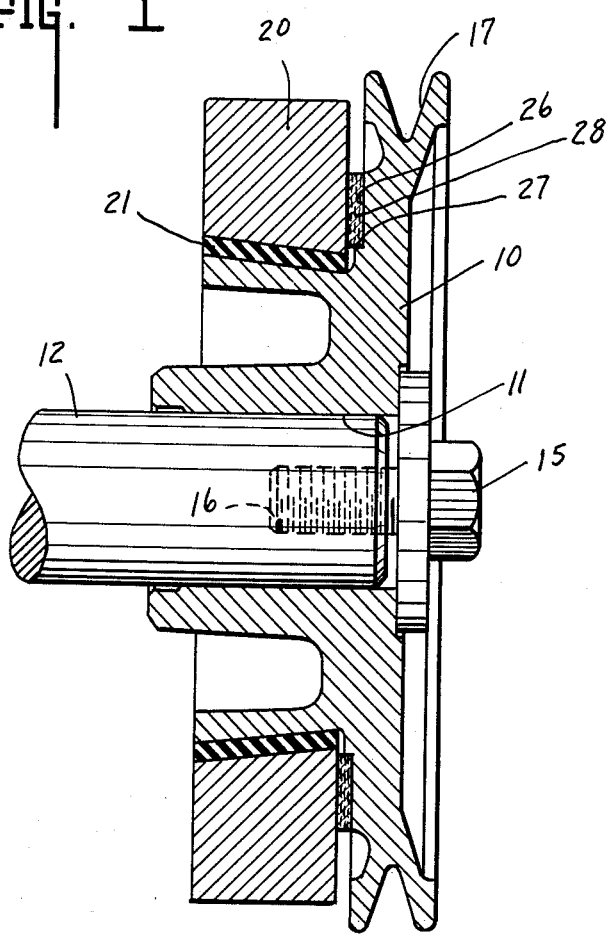
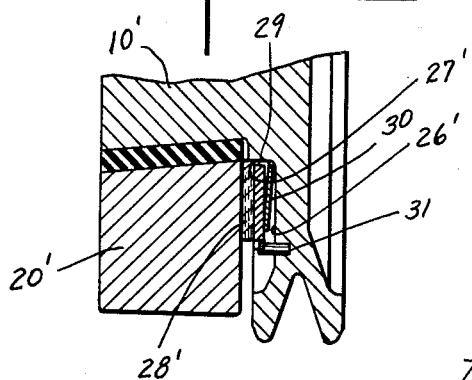
INVENTOR.
SANFORD A. McGAVERN.
BY
Lockwood, Woodard, Smith & Weikart.
ATTORNEYS.

United States Patent Office 3,078,737
Patented Feb. 26, 1963

3,078,737
TUNED FRICTION DAMPER
Sanford A. McGavern, Indianapolis, Ind., assignor to Schwitzer Corporation, Indianapolis, Ind., a corporation
Filed Nov. 12, 1959, Ser. No. 852,305
5 Claims. (Cl. 74—574)

This invention relates to vibration dampers and more particularly relates to torsional vibration dampers of the type adapted to be mounted on the end of a crankshaft of a reciprocating engine.

Conventional dampers of this character comprise two concentric members, the inner one of which may be attached to and driven from the engine crankshaft and the outer one of which may be a driven inertia member held in contact with the driving member by means of an elastic element. In some cases the elastic element is precompressed on to the central driving member or it may in some cases be bonded or otherwise adhered to both the central driving member and the driven inertia member.

In some designs of a torsional vibration damper it is difficult to achieve a low natural torsional frequency without the use of an elastic element the thickness or radial dimension of which is relatively great with respect to the width or axial dimension of the elastic element. In such an arrangement the axial spring rate is frequently so soft that the inertia member may be easily moved off the driving member by axial forces resulting from fore and aft vibration of the engine, fore and aft inertia forces of the engine caused by stopping and starting the propelled vehicle, or gyroscopic effects, or a combination of these forces and effects.

In the solution of some torsional vibration damper problems, it is difficult to achieve an adequate amount of damping by changing the compounding of the elastic element. In such cases the provision of additional damping by means of a mechanical system is often helpful.

It is an object of this invention to provide a vibration damper system in which a low natural torsional frequency is maintained without excessive reduction of the axial spring rate in the direction of escape of the inertia member from the driving member.

A further object is to provide a vibration damper system incorporating means for providing an axial spring rate which increases disproportionately and non-linearly as the inertia member tends to move off the driving member.

Still another object of the present invention is to provide a device for retaining the inertia member on the driving member without the use of bonding or adhesives.

A further object of the present invention is to provide a vibration damper system incorporating novel means for increasing the amount of damping of the system.

The full nature of the invention will be understood from the accompanying drawings and the following description and claims:

FIG. 1 is a sectional view of a vibration damper embodying the present invention, the view being taken as including the axis of rotation of the device.

FIG. 2 is a fragmentary sectional view similar to FIG. 1 of an alternative embodiment of the invention.

The damper assembly embodying this invention comprises a driving member 10 having a concentric bore 11 proportioned to receive a crankshaft 12 or other rotatable shaft to be damped. The driving member 10 may be mounted upon the shaft 12 by means of a cap screw 15 threadedly received within the threaded bore 16 in the end of the shaft 12. Depending upon the particular application for which the device is to be used, the driving member 10 may be provided with a peripheral pulley groove 17. For example, if the shaft 12 is a crankshaft of a reciprocating engine of an automobile, the pulley groove 17 may be used to drive the generator and/or the fan of the automobile.

An inertia member 20 is mounted co-axially of the driving member 10 by means of an annular elastic element 21. The driving member 10 and the inertia member 20 have, respectively, outer and inner frustoconical surfaces which are radially spaced by means of the elastic element 21 which also has a frustoconical shape. The frustoconical shape of the driving member 10 is the feature of the present invention that provides means for retaining the inertia member on the driving member without necessitating a large increase of the spring rate in shear or torsion of the elastic element 21. Since, generally speaking, the torsional frequency varies as does the torsional spring rate of the elastic element 21, it is relatively easy with the present invention to design a system which has a low natural torsional frequency yet will not allow the inertia member 20 to slip off the driving member 10.

The driving member 10 is provided with a radial surface 26 and an outwardly facing cylindrical surface 27 for reception of a flat annular spacer member 28 which spaces the inertia member 20 from the driving member 10. The present device may be so constructed that the elastic element 21 does or does not have a precompression therein. If there is no precompression, then the spacer member 26 acts only as a buffer preventing the inertia member from striking driving member 10.

In most cases, however, the elastic member will not be bonded to the driving or inertia member and will have a precompression therein which will force the inertia member 20 against the spacer member 28. Thus the spacer member 28 may be used to determine amount of damping produced by the assembly. Extra damping beyond that available in the elastic member 21 may be provided by constructing the spacer member of material having high friction, such as, for example, brake lining material. If the spacer is of low friction, however, then the damping of the elastic member will be little altered.

Referring to FIG. 2, an alternative embodiment of the invention is illustrated which is identical to the above described embodiment with the exception that there is additionally provided means for taking up wear of the spacer member 28'. An annular frustoconical spring 30 is received about the driving member 10' upon the outwardly facing cylindrical surface 27' between an annular friction plate 29 and the radial surface 26'. The spring 30 is initially stressed or flexed during assembly so that as the spacer member 28' becomes worn it will be maintained in contact with the inertia member 20' with approximately the same force. A pin 31 is received within suitable apertures in the driving member 10' and the plate 29 for driving the plate 29 at the same speed as the driving member.

The apex angle of the above mentioned frustoconical surfaces and shapes also has an effect on the damping of the system because it will affect the axial spring rate of the elastic member in forcing the inertia member against the driving member. Thus, if it is desired that this spring rate be very soft, the apex angle should be small. However, if it is desired that this spring rate be a relatively high value, the apex angle should be relatively large.

A further advantage of the present invention is that the inertia member does not have to be secured upon the driving member by the use of bonding or adhesives because of the inclination of the frustoconical surfaces of the driving member and the inertia member and will be securely held in place by the precompression in the elastic member.

In the embodiments illustrated, the least diameter of the inertia member is sufficiently large that the inertia member may be slipped onto the driving member; however, if the angle of inclination of the frustoconical surfaces is greater than that illustrated, it will be necessary to form the inertia member in two or more parts to be connected together after assembly upon the driving member. Alternatively the pulley may be made separable from the main body of driving member.

It should be noted that the present invention provides a vibration damper system in which a low natural torsional frequency may be maintained without excessive reduction of the axial spring rate. This is accomplished by setting the angle of inclination or apex angle of the frustoconical surfaces at such a value that the axial spring rate of the system will rise to a very high value when the inertia member begins to move off of the driving member thus preventing escape of the inertia member. A material is then used for the spacer member which provides the desired low damping force and retains the normal low natural torsional frequency.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A vibration damper comprising a driving member having a generally radial face and having a frustoconical surface which converges toward said radial face, an annular inertia member surrounding said frustoconical surface and having an inward surface which is parallel to and spaced from the frustoconical surface of said driving member, a flat annular spacer member located between said radial surface and said inertia member, and a frustoconical elastic element received between and contacting said frustoconical surface and said inward surface, said elastic element having a precompression therein which urges said inertia member against said spacer member, said elastic element and said spacer member being the only means contacting said inertia member to mount it on said driving member.

2. A vibration damper comprising a driving member having a generally radial face and having a frustoconical surface which converges toward said radial face, an annular inertia member surrounding said frustoconical surface and having an inward surface which is parallel to and spaced from the frustoconical surface of said driving member, a flat annular spacer member located between and contacting said radial face and said inertia member, the damping force being determined by the frictional characteristics of said flat annular spacer member, and a frustoconical elastic element received between and contacting said frustoconical surface and said inward surface, the apex angle of said frustoconical and inward surfaces and said frustoconical element being sufficiently great as to prevent said inertia element from slipping off said driving element, said elastic element having a precompression therein which urges said inertia member against said spacer member, said elastic element and said spacer member being the only means contacting said inertia member to mount it on said driving member.

3. A vibration damper comprising a driving member adapted to be rotated about an axis, an inertia member mounted coaxially of said driving member, said driving member and said inertia member including radially spaced frustoconical surfaces, a frustoconical elastic element interposed between said surfaces in engagement therewith, said members having mutually facing radial surfaces arranged to move closer together as said frustoconical surfaces move apart, and a spacer member of predetermined frictional characteristics arranged between and in engagement with said mutually facing radial surfaces, said elastic element having a precompression therein which urges said inertia member against said spacer member, said elastic element and said spacer member being the only means contacting said inertia member to mount it on said driving member.

4. A vibration damper comprising a driving member having a generally radial face and having a frustoconical surface which converges toward said radial face, an annular inertia member surrounding said frustoconical surface and having an inward surface which is parallel to and spaced from the frustoconical surface of said driving member, a flat annular spacer member located between said radial surface and said inertia member, and a frustoconical elastic element received between and contacting said frustoconical surface and said inward surface, said elastic element having a precompression therein which forces said inertia member against said spacer member, the apex angle of said frustoconical and inward surfaces and said frustoconical element being sufficiently great so as to cause the axial spring rate of the elastic element to increase disproportionately and nonlinearly as said inertia element tends to slip off said driving element, the amount of damping of the damper being added to by the frictional characteristics of the flat annular spacer member and by the action of the precompression in the elastic element causing the inertia member to be forced against the spacer member, said elastic element and said spacer member being the only means contacting said inertia member to mount it on said driving member.

5. The vibration damper of claim 1 additionally comprising means for taking up wear in the spacer member.

References Cited in the file of this patent

UNITED STATES PATENTS

| | | |
|---|---|---|
| 1,830,600 | Fifield | Nov. 3, 1931 |
| 1,948,304 | Maas | Feb. 20, 1934 |
| 2,380,770 | McFarland | July 31, 1945 |
| 2,512,735 | Beier | June 27, 1950 |
| 2,939,338 | Troyer | June 7, 1960 |
| 2,972,904 | Troyer | Feb. 28, 1961 |

FOREIGN PATENTS

| | | |
|---|---|---|
| 217,928 | Great Britain | Sept. 23, 1925 |
| 876,921 | France | Aug. 24, 1943 |